United States Patent [19]
Kimmel et al.

[11] 3,774,225
[45] Nov. 20, 1973

[54] METHOD FOR PRODUCING A VISIBLE RECORD OF GAS FLOW PATTERNS

[75] Inventors: Heinz Kimmel; Heinrich Opitz, both of Erlangen, Germany

[73] Assignee: Siemens Aktiengesellschaft, Munich, Germany

[22] Filed: July 7, 1972

[21] Appl. No.: 269,821

[30] Foreign Application Priority Data
July 7, 1971  Germany................... P 21 33 834.1

[52] U.S. Cl................ 346/1, 73/432 R, 116/117 R, 346/107
[51] Int. Cl...................................................... G01d
[58] Field of Search............................. 346/1, 107; 73/432 R, 147, 168; 23/232 R; 116/117 R

[56] References Cited
UNITED STATES PATENTS
3,357,024  12/1967  Webb..................................... 346/1

Primary Examiner—Joseph W. Hartary
Attorney—Hugh A. Chapin

[57] ABSTRACT

A method of producing a visible record of the flow patterns of a gas about a surface. The method includes an initial step of applying a layer of photographic material to the surface, the layer having an initially uniform moisture level throughout. The gas, at a different moisture level relative to the layer, is caused to flow past the surface for a sufficient period to create differential moisture levels over the layer dependent on the flow pattern of the gas across the surface. The next step is to create a latent photographic image within the layer corresponding to the differential moisture levels over the layer. Finally the latent photographic image is developed into a visible image.

9 Claims, 6 Drawing Figures

PATENTED NOV 20 1973 3,774,225

METHOD FOR PRODUCING A VISIBLE RECORD OF GAS FLOW PATTERNS

BACKGROUND OF THE INVENTION

This invention relates to a method for producing a visible record of the flow pattern of a gas about a surface. In particular the invention provides such a method which is particularly suitable for investigating and displaying the gaseous flow patterns of components of vacuum cleaners, heater fans, air conditioning systems and the like.

Presently known methods for providing a visible record of the gaseous flow patterns through, for example, blower components such as rotors and guide vanes, include smoke tracing methods and the so-called "Schlieren" method. However such methods require models of the components to be formed in transparent material and in addition require photographic high speed recording both of which factors contribute to high expense.

Another method which has been applied in ultrasound experiments is based on evaporation of fluorescent organic substances applied to the surface subjected to flow, which becomes differentially heated responsive to the flow pattern about the surface. One such method, disclosed in a publication by E.J. Richards and F.H. Burstall, Aer. Res. Comm. Report & Memorandum No. 2126 (August 1945), includes photographic recording of the surfaces which are irradiated with ultra-violet light. Where flow is subsonic, however, this method may not be feasible because insufficiently strong temperature changes occur.

Thus there is presently a need for a relatively inexpensive method for producing a visible record of gaseous flow patterns, particularly where the flow is in the subsonic range.

SUMMARY OF THE INVENTION

The present invention provides a method of producing a visible record of the flow pattern of a gas about a surface, which obviates or minimizes problems of the type previously discussed.

More particularly, the present invention provides a method of producing a visible record of the flow pattern of a gas about a surface by the creation of differential moisture patterns in a layer of photographic material. A layer of photographic material is applied to the surface with the layer having an initially uniform moisture level throughout. The gas, at a different moisture level relative to the layer, is caused to flow past the surface. The flow is continued for a sufficient period to create differential moisture levels over the layer dependent on the flow pattern of the gas about the surface. In a following step a latent photographic image is created within the layer corresponding to the differential moisture levels over the layer. This step may be accomplished, for example, by passing air containing $H_2S$ over the layer where it will cause greater intensity of darkening in the areas of greater moisture. Finally the latent photograph image is developed, using conventional photographic developers, to provide a permanent visible image having areas of greater and less darkness corresponding to the gaseous flow pattern about the surface.

DESCRIPTION OF THE PREFERRED EMBODIMENTS

Figure 1:
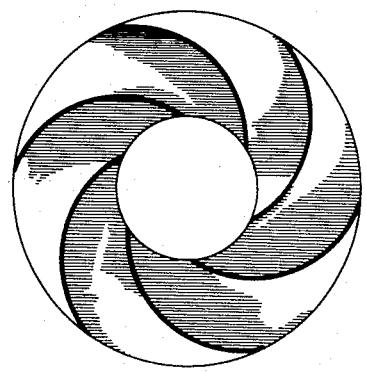
FIG. 1 shows a photographic positive copy from a developed photo-negative image of the gaseous flow through the rotor of a centrifugal blower, the photo-negative image being produced in accordance with the method of the invention.

A method of producing a visible record of the flow pattern of gas over a surface, according to a preferred embodiment of the invention, includes an initial step of applying a layer of photographic material to the surface. By photographic material will be understood a conventional photographic emulsion such as a gelatinous material in which is uniformly dispersed a photensensitive material such as a silver halide. Other conventional photosensitive emulsions utilized in photographic practice may be employed.

The layer of photographic material may be applied directly to the surface exposed to the flow, as an emulsion. Also, the photographic material may be disposed on a substrate in the form of a conventional sheet of photographic film lying in the plane of the flow path of the gas and disposed at right angles to the surface about which the gaseous flow pattern is to be studied.

Initially the photographic layer may be dry or may have a uniform moisture level throughout. The gas constituting the flow, which may be atmospheric air, inert gases, or other gas, is caused to have a different moisture level relative to the film. For example the invention can be conducted utilizing an initially dry film and a moist flow of gas or, alternatively, by using an initially moist film and a flow of dry gas. Gaseous flow is continued past the surface under steady flow conditions and differential moisture levels at different locations on the photographic layer are produced in accordance with the flow pattern of the gas about the surface. This creates a moisture profile in the photographic layer corresponding to the flow pattern of gas about the surface.

The flow of gas is then terminated and a latent photographic image is created within the layer by briefly passing over it a gas stream containing photochemically reactive gases such as air containing hydrogen-sulfide. Besides $H_2S$, other photochemically reactive gases such as phosphene may also be used. The creation of the latent image in the photographic layer arises because at points of higher moisture content the HS— ions which form as development nuclei by the reaction of $H_2S$ with $H_2O$, produce, in the subsequent photographic development process, a higher degree of blackening than do regions of lower moisture. Thereafter the generated active centers are developed into a normal photographic picture by use of standard, commercially available developers to produce a black and white negative image which is an image of the differential moisture levels in the photographic lever. The developed and fixed negative can be reproduced without diffulty by customary photographic methods and photographic-positive copies (with relative black and white reversal) can be printed from the negative.

The previously described step of creating a moisture profile in the photographic layer depends largely on the formation of the boundary layer which forms on the surface exposed to the flow according to well-known aerodynamic principles. The boundary layer separates the surface of the photographic layer from the free flow. For the moisture profile to be created, moisture passes from the photographic layer through the boundary layer and is carried away by the adjacent flow. A transfer in the opposite direction occurs when the hydrogen-sulfide containing gas is passed over the surface to create the latent image, or when a relatively moist gas flow and a dry photographic layer are being employed. The boundary layer is therefore mainly responsible for the generation of the image and tests have confirmed that the drying of the photographic layer takes place more rapidly as the boundary layer is thinner. Accordingly, the blackening of the negative image ultimately developed decreases with decreasing thickness of the boundary layer. As there are well-known relations between the conformation of the boundary layer formed during flow of gas over a surface and the adjacent flow, the proportionate gradation of blackening created on the negative image formed in the photographic layer provides a representation of the flow pattern.

In an alternative embodiment of the invention, the photographic layer is moistened not with water but with a photographic developer solution and the moisture profile produced by exposure to the flow of an inert dry gas is rendered visible by subsequent exposure to light. Following this embodiment it is advisable to utilize light transparent installations so that the subsequent exposure to light may take place immediately after or even during the flow exposure.

The foregoing methods are particularly suitable for use in determining the steady flow processes of gases, particularly air, in blower rotors, stators and housings. Such knowledge is particularly important for the design of high performance, low noise, small blowers of the type needed, for example, in vacuum cleaners, heater fans, air conditioning systems and the like.

The method has been practiced in performing the following examples.

EXAMPLE I

A sheet of flat photographic film which had been moistened in water was mounted adjacent the turbine wheel of a vacuum cleaner blower. After the blower was assembled, it was fed during the starting phase with air of 100 percent relative moisture until steady state flow conditions were established in the blower at which time a change to relatively dryer, normal air was made. The moist photographic layer was dried out to different moisture levels over its surface during this drying phase, depending on the flow pattern established. While the blower continued to run at constant speed, air containing $H_2S$ was fed from a mixing vessel at the rate of 35 liters per second of which 5 percent by volume constituted $H_2S$. During the passage of the $H_2S$ over the drying profile the $H_2S$ reacted with the photosensitive constituent in the photographic layer to produce an effect thereon similar to exposure to light thereby providing a latent image. After the blower was switched off, the sheet of film was removed and developed by customary photographic methods to render a visible, photographic-negative image.

Figure 2:
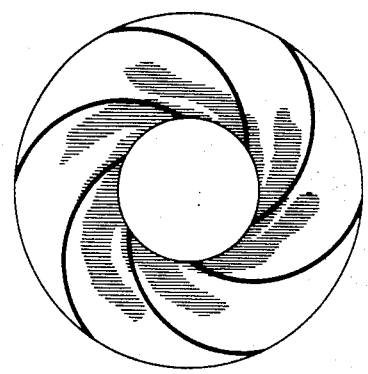
FIG. 2 shows a photographic-positive copy flow pattern similar to FIG. 1 but at different flow conditions.

FIGS. 1 and 2 show photographic-positive copies made from the photographic negative images of flow pictures obtained in accordance with this example. As may be seen, they provide a basis for conclusions concerning the magnitude and direction of the steady flow established in the blower. For example it may be seen that the flow hugs the concave sides of the blades and proceeds preferentially on that side.

EXAMPLE II

Figure 3:
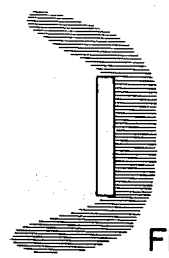
FIG. 3 shows a photographic-positive copy made from a photo-negative image produced in accordance with the invention on a photographic layer lying in the plane of a flow of gas past a flow surface comprising a plate mounted perpendicularly to the direction of the flow, the photographic layer being perpendicular to the plate.
Figure 4:
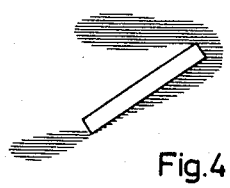
FIG. 4 shows a photographic-positive copy produced in a similar manner to that of FIG. 3 but where the flow surface is a plate inclined to the direction of flow.
Figure 5:
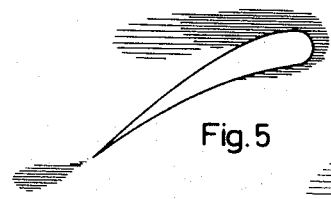
FIG. 5 shows a photographic-positive copy made in a similar manner to that of FIG. 3 but where the flow surface is a stalled aerofoil inclined to the direction of flow.

A flat sheet of film was mounted in the plane of the gaseous flow over a flat plate extending across the path of the flow and mounted in perpendicular relation to the film. The photographic film was first moistened and the gaseous flow comprised successive phases of moist air, dry air and air containing $H_2S$, in a manner similar for Example I. The experiment was conducted with the plate normal to the flow and with the plate at an inclination and developed negative images were obtained from which were reproduced the photographic positive copies shown in FIGS. 3 and 4. From these figures, the shift of the stagnation point towards the edge of the flow plate facing the flow, which occurs in the inclined position, is evident.

EXAMPLE III

Figure 6:
FIG. 6 shows a photographic-positive copy made in a similar manner to that of FIG. 3 but where the flow surface is a cylinder.

In an analagous manner, to Example II, the pattern of gas flow round an aerofoil at a very large angle of attack, was obtained. A photographic-positive copy from the photonegative image thus obtained, is shown in FIG. 6. The separation of the flow at the upper side of the aerofil occurring in the stalled condition, is shown quite plainly. On the lower side, however, the flow adheres completely smoothly over the entire length of the areofoil.

EXAMPLE IV

In an analagous manner to that described in Example II, the pattern of gas flow round a cylinder was obtained. A photographic-positive copy from the photonegative image obtained by the practice of the method in this experiment, is shown in FIG. 6.

We claim:

1. A method of producing a visible record of the flow pattern of a gas stream about a surface, the method comprising the steps of:
   applying a layer of photographic material to the surface, the layer having an initially uniform moisture level throughout,
   causing a flow of the gas, at a different moisture level relative to the layer, past the surface, the flow continuing for a sufficient period to create differential moisture levels over the layer dependent on the flow pattern of the gas across the surface, creating a latent photographic image within the layer corresponding to the differential moisture levels over the layer; and developing the latent photographic image into a visible image.

2. A method as defined in claim 1 wherein the gas is inert and is relatively more dry than the initial moisture level of the photographic layer.

3. A method as defined in claim 1 wherein the gas has a relatively higher moisture level than the initial level of moisture content in the photographic layer.

4. A method as defined in claim 3 wherein the gas is moist atmospheric air.

5. A method as defined in claim 1 wherein the step of creating a latent photographic image comprises passing inert gas containing $H_2S$ over the layer after the differential moisture levels have been created therein.

6. A method as defined in claim 1 wherein the step of creating a latent photographic image comprises passing air containing $H_2S$ over the layer after the differential moisture levels have been created therein.

7. A method as defined in claim 1 wherein the step of creating a latent photographic image comprises passing air containing phosphene over the layer after the differential moisture levels have been created therein.

8. A method as defined in claim 1 wherein the surface to which the photographic layer is applies is an aerodynamic surface of a blower.

9. A method of producing a visible record of the flow pattern of a gas past the surface, the method comprising the steps of:

applying a layer of photographic material to the surface, the layer being uniformly moistened with a developer solution, causing a flow of the gas at a different moisture level relative to the layer past the surface, the flow continuing for a sufficient period to create differential moisture levels over the layer dependent on the flow pattern of gas past the surface and exposing the photographic layer to light to create a visible image.

* * * * *

UNITED STATES PATENT OFFICE
CERTIFICATE OF CORRECTION

Patent No. 3,774,225  Dated November 20, 1973

Inventor(s) Heinz Kimmel, Heinrich Opitz

It is certified that error appears in the above-identified patent and that said Letters Patent are hereby corrected as shown below:

In column 3, line 7 change "lever" to --layer--

In column 6, line 6, claim 8, change "applies" to --applied--

Signed and sealed this 16th day of July 1974.

(SEAL)
Attest:

McCOY M. GIBSON, JR.
Attesting Officer

C. MARSHALL DANN
Commissioner of Patents